United States Patent
Onishi et al.

[11] Patent Number: 6,079,450
[45] Date of Patent: Jun. 27, 2000

[54] METAL DIAPHRAGM TYPE PULSATION ABSORBER FOR HIGH-PRESSURE FUEL PUMP

[75] Inventors: Yoshihiko Onishi; Shigenobu Tochiyama, both of Tokyo, Japan

[73] Assignee: Mitsubishi Denki Kabushiki Kaisha, Tokyo, Japan

[21] Appl. No.: 09/400,838

[22] Filed: Sep. 21, 1999

[30] Foreign Application Priority Data

Feb. 26, 1999 [JP] Japan .................................. 11-051660

[51] Int. Cl.⁷ .................................................. F16L 55/04
[52] U.S. Cl. .............................. 138/30; 138/26; 220/721
[58] Field of Search .............................. 138/26, 30, 31; 220/720–724

[56] References Cited

U.S. PATENT DOCUMENTS

| | | | |
|---|---|---|---|
| 3,366,144 | 1/1968 | Durst | 138/30 |
| 3,948,288 | 4/1976 | Mayer | 138/30 |
| 6,019,134 | 2/2000 | Onishi | 138/30 |
| 6,019,135 | 2/2000 | Ohishi | 138/30 |

FOREIGN PATENT DOCUMENTS 2-156128  6/1990  Japan .

*Primary Examiner*—Patrick Brinson
*Attorney, Agent, or Firm*—Sughrue, Mion, Zinn, Macpeak & Seas, PLLC

[57] ABSTRACT

To improve the rigidity of diaphragms, a plurality of diaphragms of the same thickness and size are placed one upon another, the total thickness of the diaphragms is a value obtained by multiplying the thickness of the diaphragm by the number of diaphragms, and the peripheral portions of the diaphragms are sealed and supported by a high-pressure container.

4 Claims, 7 Drawing Sheets

PRESSURE FROM FIRST HIGH-PRESSURE CHAMBER SIDE

METAL DIAPHRAGM TYPE PULSATION ABSORBER FOR HIGH-PRESSURE FUEL PUMP

BACKGROUND OF THE INVENTION

1. Field of the Invention

The present invention relates to a metal diaphragm type pulsation absorber for a high-pressure fuel pump.

2. Description of the Prior Art

A diesel engine is widely known as an engine in which fuel is injected in the cylinders of the engine, so-called "intra-cylinder injection engine" or "direct injection engine". An intra-cylinder injection system has recently been proposed for a spark-ignition engine (gasoline engine). This intra-cylinder injection engine is constituted to obtain a sufficiently high fuel injection pressure and required to suppress fuel pressure pulsation for stable injection. Therefore, a compact, single-cylinder high-pressure fuel pump which has a simple structure and is produced at a low cost is already known. Since the single-cylinder high-pressure fuel pump has only one plunger, the pressure of fuel to be injected has a considerable pulsation width. Therefore, a metal bellows type or metal diaphragm type pulsation absorber for absorbing this pulsation is proposed for the single-cylinder high-pressure fuel pump.

FIG. 8 is a diagram typically showing an auto fuel supply system of the prior art. In FIG. 8, reference numeral 1 denotes a delivery pipe which is a fuel injector, and 2 the injectors of the delivery pipe 1 corresponding to the number of unshown engine cylinders. Denoted by 3 is a high-pressure fuel pump installed in a housing, and 4 the high-pressure pump of this high-pressure fuel pump 3. This high-pressure pump 4 is an element for increasing the pressure of fuel to a high level by means of a piston driven by an unshown cam which rotates at a rotation speed half that of an engine and a cylinder for containing this piston in such a manner that it can reciprocate. Reference numeral 5 represents a low-pressure passage connected to the inlet port of the high-pressure pump 4, 6 a filter installed in the low-pressure passage 5, 7 a metal bellows type low-pressure damper connected to the low-pressure passage 5 between the high-pressure pump 4 and the filter 6, 9 a high-pressure passage connected to the outlet port of the high-pressure pump 4, 10 a diaphragm type high-pressure damper connected to the high-pressure passage 9 by a branch passage 11, 12 a high-pressure check valve installed in the high-pressure passage 9 on the outlet side of the high-pressure damper 10, 13 a high-pressure back passage which branches off from the high-pressure passage 9 on the outlet side of the high-pressure check valve 12, 14 a filter installed in the high-pressure back passage 13, 15 a high-pressure regulator installed in the high-pressure return passage 13 on the downstream side of the filter 14, 16 the drain passage of the high-pressure pump 4, 17 a high-pressure pipe for connecting the high-pressure passage 9 of the high-pressure fuel pump 3 to the delivery pipe 1, 18 a fuel tank, 19 a low-pressure pump installed in the fuel tank 18, 20 a filter on the inlet side of the low-pressure pump 19, 21 a low-pressure pipe for connecting the outlet side of the low-pressure pump 19 to the inlet side of the high-pressure fuel pump 3, 22 a low-pressure check valve installed in the low-pressure pipe 21, 23 a filter installed in the low-pressure pipe 21 closer to the high-pressure fuel pump 3 than to the low-pressure check valve 22, 24 a low-pressure back pipe for connecting the high-pressure fuel pump 3 side and not the filter 23 side of the low-pressure pipe 21 to the fuel tank 18, 25 a low-pressure regulator installed in the low-pressure back pipe 24, 26 a drain pipe for connecting the drain passage 16 of the high-pressure fuel pump 3 to the fuel tank 18, 27 a high-pressure back pipe for connecting the high-pressure back passage 13 of the high-pressure fuel pump 3 to the fuel tank 18, and 28 fuel stored in the fuel tank 18.

A description is subsequently given of the operation of the above fuel supply system. The low-pressure pump 19 sucks the fuel 28 through the filter 20, increases the pressure of the fuel 28 to a low level and discharges it. This low-pressure fuel 28 is supplied to the high-pressure fuel pump 3 by the low-pressure pipe 21 through the low-pressure check valve 22 and the filter 23. When the pressure of the fuel 28 in the low-pressure pipe 21 exceeds a low level set by the low-pressure regulator 25, part of the fuel 28 in the low-pressure pipe 21 is returned to the fuel tank 18 by the low-pressure back pipe 24 through the low-pressure regulator 25, thereby controlling the pressure of the fuel 28 to be supplied to the high-pressure fuel pump 3 from the fuel tank 18 to a predetermined low level. The fuel 28 which reaches the high-pressure fuel pump 3 is sucked into the high-pressure pump 4 through the filter 6 and the low-pressure damper 7 in the low-pressure passage 5. The high-pressure pump 4 increases the pressure of the sucked fuel 28 to a high level, discharges the fuel 28 in the high-pressure passage 9 and also drains the fuel 28 leaked between the piston and the cylinder of the high-pressure pump 4 in the drain passage 16. The fuel 28 drained in the drain passage 16 returns to the fuel tank 18 through the drain pipe 26. The fuel 28 supplied to the high-pressure passage 9 is delivered to the delivery pipe 1 through the high-pressure damper 10 and the high-pressure check valve 12. When the pressure of the fuel 28 in the high-pressure passage 9 exceeds a predetermined high level set by the high-pressure regulator 15, part of the fuel 28 in the high-pressure passage 9 is returned to the fuel tank 18 by the high-pressure back passage 13 and the high-pressure back pipe 27 through the filter 14 and the high-pressure regulator 15, thereby controlling the pressure of the fuel to be supplied to the delivery pipe 1 from the high-pressure fuel pump 3 to a predetermined high level. In this state, the high-pressure fuel 28 is injected into a cylinder at a fuel injection time by the injector 2 of the delivery pipe 1 corresponding to the fuel injection time for the cylinder of the engine.

FIG. 9 is a sectional view of the high-pressure damper 10 and a portion therearound of the high-pressure fuel pump 3. In FIG. 9, the high-pressure damper 10 is stored in a storage recessed portion 31 formed in the body 30 of the high-pressure fuel pump 3 and constitutes a high-pressure damper which is a fuel pulsation absorber. Reference numeral 100 denotes a case, one portion of a high-pressure container, and 101 a plate as the other portion of the high-pressure container which is stored in the bottom of the storage recessed portion 31 of the body 30. Denoted by 102 is a flexible thin metal disk-like diaphragm which forms a first high-pressure chamber 103 with the case 100 and a second high-pressure chamber 104 with the plate 101. A peripheral portion of the diaphragm 102 is sealed by and supported between the case 100 and the plate 101. Reference numeral 105 is an annular clamp screw which is mated with a threaded portion 32 of the body 30 to press fit the case 100, the diaphragm 102 and the plate 101 into the bottom of the storage recessed portion 31. A sealing material 33 such as an O ring is inserted between the outer peripheral wall of the plate 101 and the inner peripheral wall of the storage recessed portion 31 to prevent fuel leakage. First and second passage portions 34 and 35 constituting the branch passage 11 are formed in the body 30 in such a manner that they communicate with the bottom of the storage recessed portion 31. A dish-like first high-pressure chamber side stopper which is depressed upward and limits the movement of the diaphragm 102 is formed on the under surface (on the diaphragm 102 side) of the case 100. A recessed portion 107 which communicates with the first and second passage portions 34 and 35 is formed on the under surface (on the first and second passage portions 34 and 35 side) of the plate 101, a dish-like second high-pressure chamber side stopper 108 which is depressed downward and limits the movement of the diaphragm 102 is formed on the top surface (on the diaphragm 102 side) of the plate 101, and a plurality of through holes 109 which are open to the recessed portion 107 and the second high-pressure chamber side stopper 108 are formed in the plate 101 between the recessed portion 107 and the second high-pressure side stopper 108. Unshown gas is charged into the first high-pressure chamber 103 through a gas charging port 110 formed in the case 100 at a predetermined pressure and sealed by a plug 111. The predetermined pressure is required to absorb the pulsation of the high-pressure fuel passing through the second passage portion 35 from the first passage portion 34 through the recessed portion 107. The second high-pressure chamber 104 is filled with part of the high-pressure fuel from the recessed portion 107 through the through holes 109. 105a denotes a tool hole for operating the clamp screw 105. 112 represents a welded portion for sealing and supporting the peripheral portion of the diaphragm 102 with the case 100 and the plate 101.

A description is subsequently given of the operation of the high-pressure damper 10. When the fuel supply system of FIG. 8 starts operation by driving the engine while the first high-pressure chamber 103 is filled with gas and the second high-pressure chamber 104 is filled with fuel, the high-pressure fuel discharged by the high-pressure pump 4 flows into the second passage portion 35 from the first passage portion 34 through the recessed portion 107 as shown by arrows. When pulsation occurs in this fuel, the diaphragm 102 is bent toward the case 100 or toward the plate 101 by the total of the pressure of gas in the first high-pressure chamber 103 and the spring force of the diaphragm 102 itself to absorb the pulsation of the fuel. When a driver turns off the key switch of an automobile and the engine stops, the flow of the fuel shown by the arrows stops and the pressure of the fuel in the second high-pressure chamber 104 drops. Thereby, the pressure of the gas in the first high-pressure chamber 103 becomes higher than the total of the pressure of the fuel in the second high-pressure chamber 104 and the spring force of the diaphragm 102 itself, whereby the diaphragm is bent and finally contacts the second high-pressure chamber side stopper 108. When the pressure of gas in the first high-pressure chamber 103 is reduced by the removal of gas from the first high-pressure chamber 103, or when the diaphragm 102 is greatly bent due to a sudden rise in the pulsation pressure of the fuel, the diaphragm 102 finally contacts the first high-pressure chamber side stopper 106.

Since the high-pressure damper 10 which is the metal diaphragm type pulsation absorber of the prior art is constituted as described above, the diaphragm 102 can move toward the first or second high-pressure chamber side stopper 106 or 108 with spacing therebetween during the operation of the high-pressure damper 10 and reduces the pulsation of the fuel more as the thickness decreases. When the fuel flows into the second passage portion 35 from the first passage portion 34 through the recessed portion 107, foreign matter such as metal powders contained in the fuel may enter the second high-pressure chamber 104 from the through holes 109. When the foreign matter enters the second high-pressure chamber 104, it accumulates in the second high-pressure chamber 104 by the flow of the fuel in the second high-pressure chamber 104 caused by the movement of the diaphragm 102. When the diaphragm 102 contacts the second high-pressure chamber side stopper 108 by the suspension of the high-pressure fuel pump 3, the foreign matter accumulated in the second high-pressure chamber 104 is sandwiched between the diaphragm 102 and the second high-pressure chamber side stopper 108, whereby the diaphragm 102 is deformed by the foreign matter. There is a possibility that high stress is locally generated in the deformed portion of the diaphragm 102 and the diaphragm 102 is broken by cracking.

SUMMARY OF THE INVENTION

It is an object of the present invention to provide a metal diaphragm type pulsation absorber for a high-pressure fuel pump which can improve the rigidity of a diaphragm.

According to a first aspect of the present invention, there is provided a metal diaphragm type pulsation absorber for a high-pressure fuel pump comprising a flexible metal disk-like diaphragm which is installed in a high-pressure container forming high-pressure chambers and whose peripheral portion is sealed and supported by the high-pressure container, wherein a plurality of diaphragms having the same thickness and size as the above diaphragm are placed one upon another and the total thickness of the diaphragms is a value obtained by multiplying the thickness of the diaphragm by the number of the diaphragms.

According to a second aspect of the present invention, there is provided a metal diaphragm type pulsation absorber for a high-pressure fuel pump, wherein the plurality of diaphragms are made from different materials.

According to a third aspect of the present invention, there is provided a metal diaphragm type pulsation absorber for a high-pressure fuel pump, wherein one of the plurality of diaphragms made from different materials is made from deposition hardened stainless steel and the other is made from austenite stainless steel.

According to a fourth aspect of the present invention, there is provided a metal diaphragm type pulsation absorber for a high-pressure fuel pump, wherein the diaphragm made from austenite stainless steel is arranged on a side which receives the pulsation of high-pressure fuel.

The above and other objects, advantages and features of the present invention will become more apparent from the following description when taken into conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
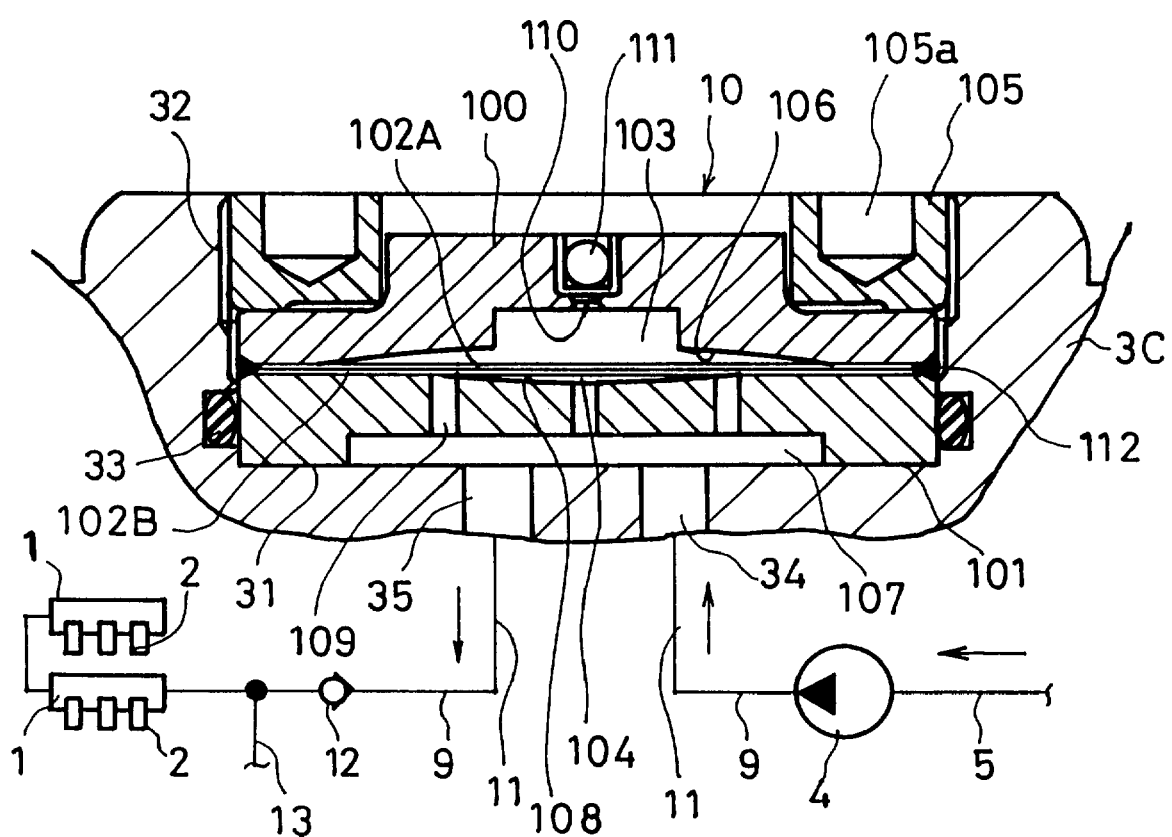
FIG. 1 is a sectional view of a high-pressure damper and a portion therearound of a high-pressure fuel pump according to Embodiment 1 of the present invention.
Figure 2:
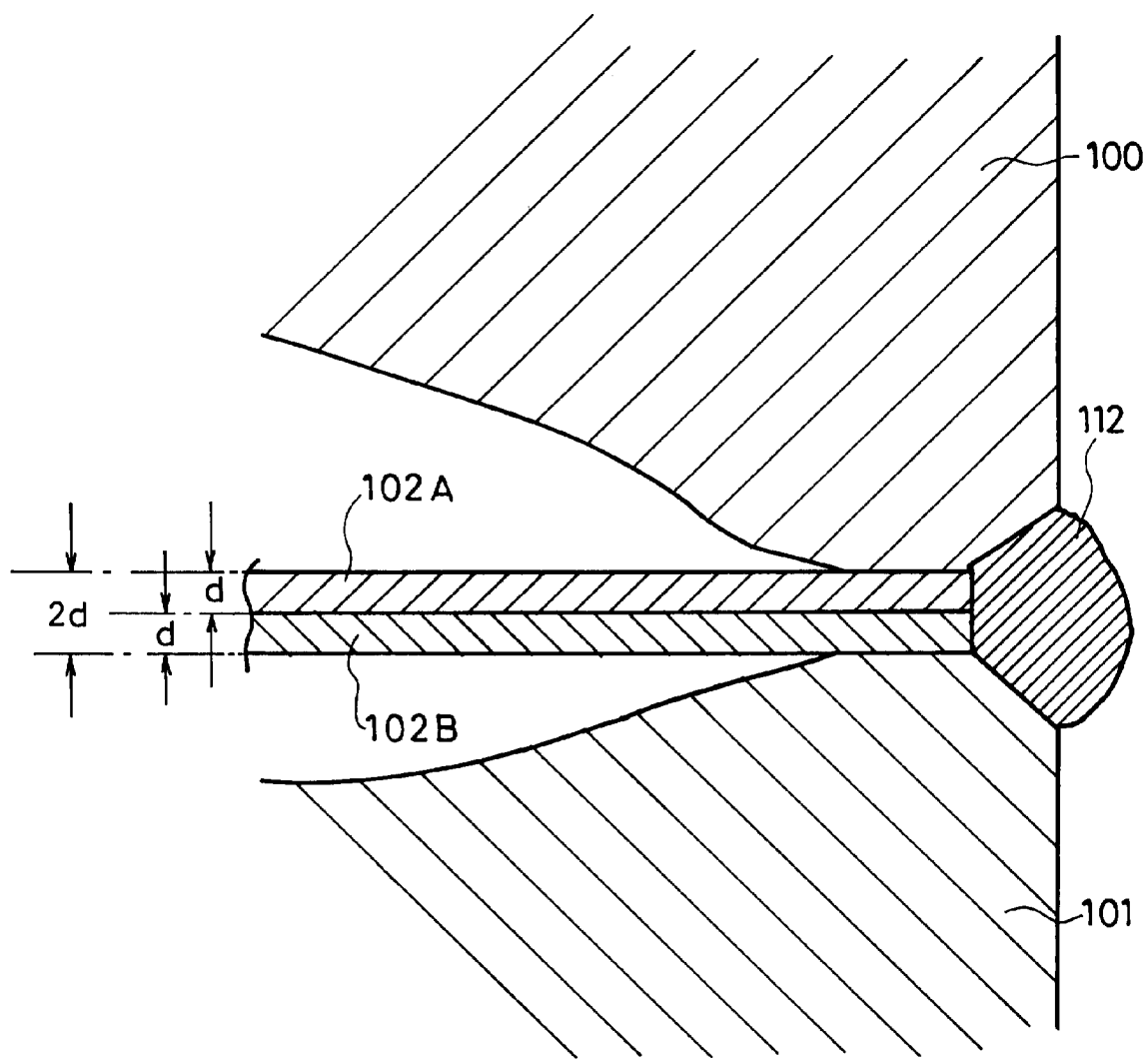
FIG. 2 is an enlarged sectional view of key portions of the high-pressure fuel pump according to Embodiment 1.
Figure 3:
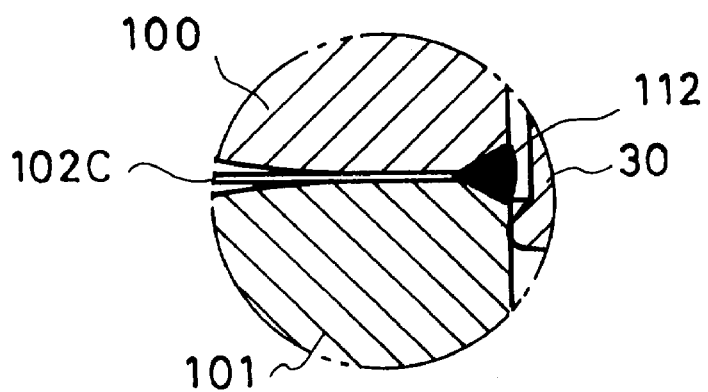
FIG. 3 is a sectional view of Comparative Example.
Figure 4:
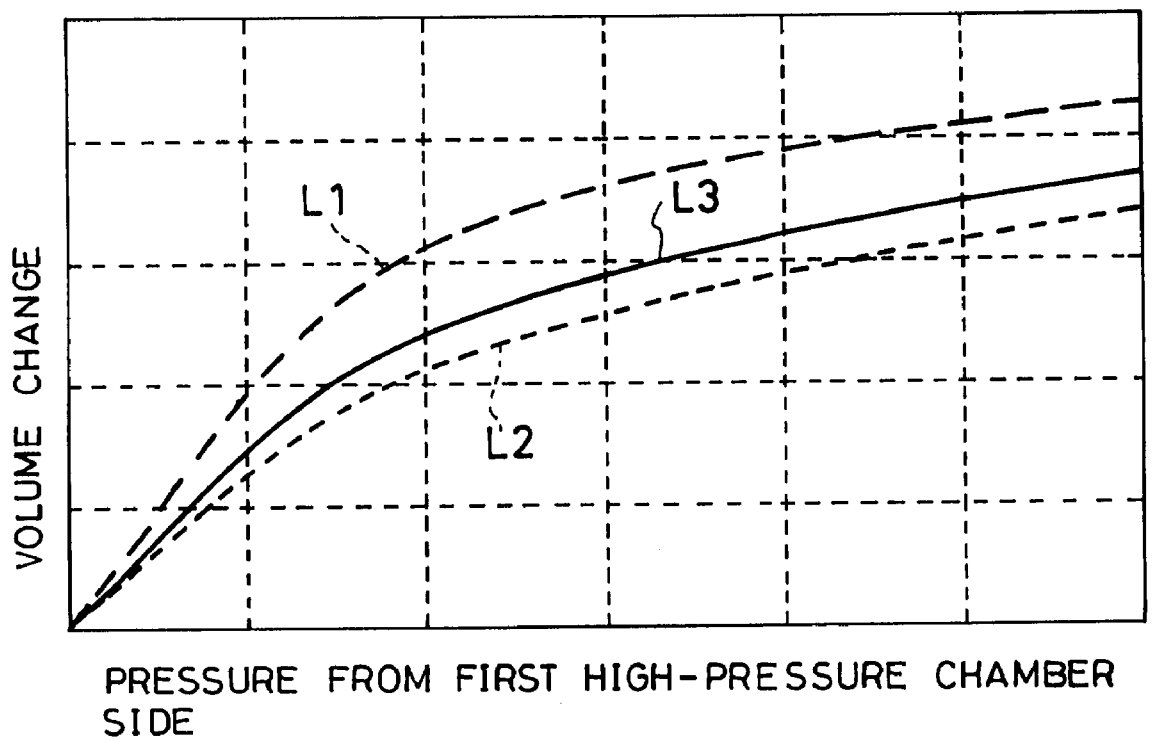
FIG. 4 is a graph showing the results of a rigidity comparison test among the prior art, Comparative Example and Embodiment 1.
Figures 5, 6:
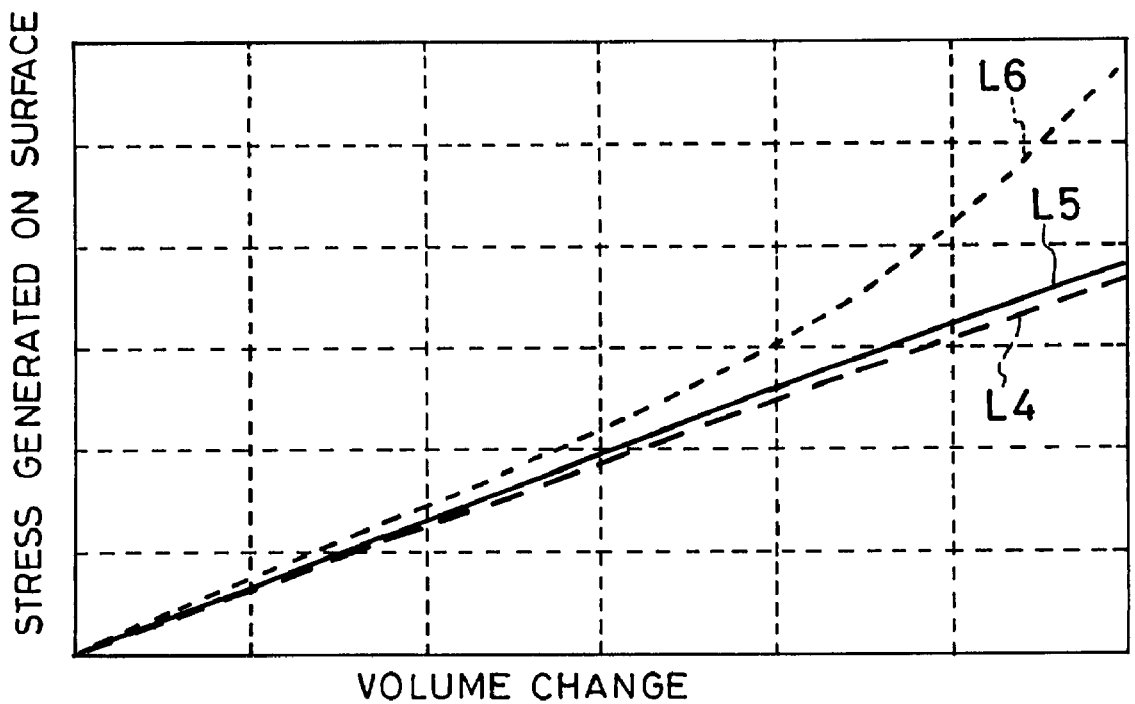
FIG. 5 is a graph showing the results of a stress comparison test among the prior art, Comparative Example and Embodiment 1.
FIG. 6 is a table showing the results of judgment on the prior art, Comparative Example and Embodiment 1.
Figure 9:
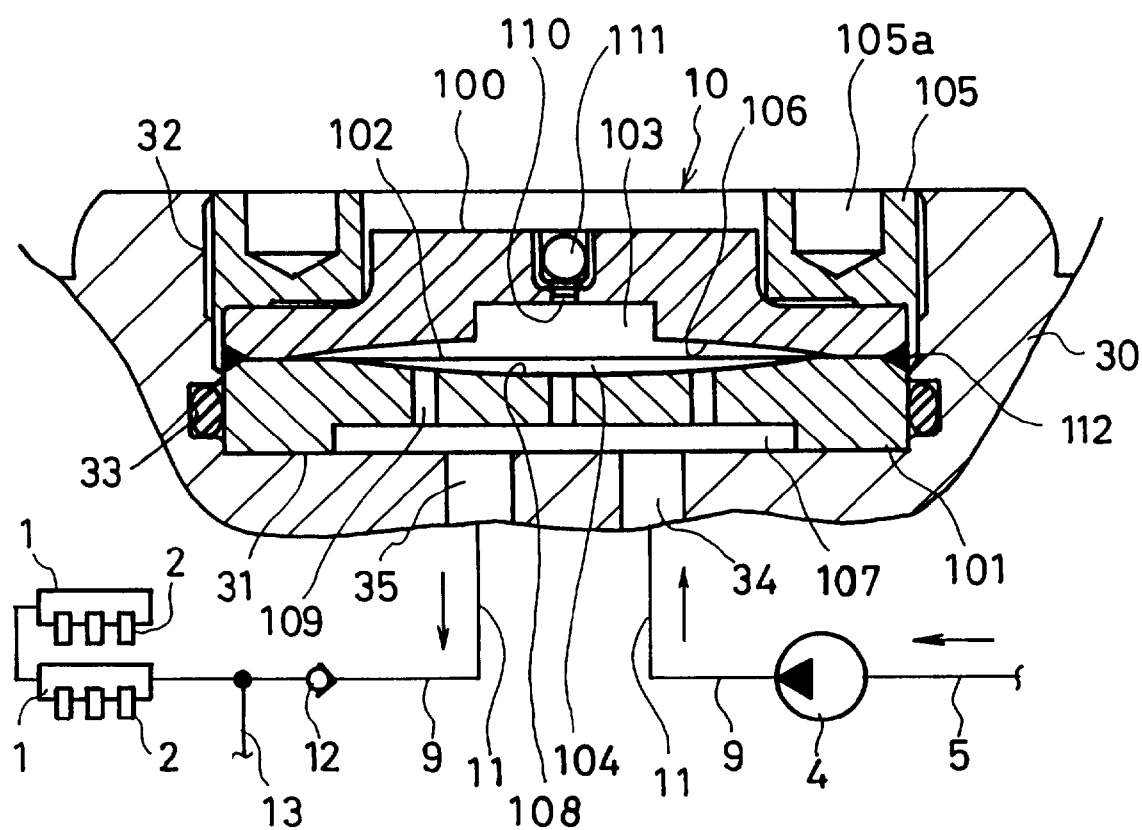
FIG. 9 is a sectional view of a high-pressure damper and a portion therearound of a high-pressure fuel pump of the prior art.

FIG. 1 is a sectional view of a high-pressure damper 10 and a portion therearound of a high-pressure fuel pump 3 according to Embodiment 1 of the present invention, FIG. 2 is an enlarged sectional view of key portions of the high-pressure damper 10, FIG. 3 is a sectional view of Comparative Example, FIG. 4 is a graph showing the results of a rigidity comparison test on the high-pressure damper 10, FIG. 5 is a graph showing the results of a stress comparison test on the high-pressure damper 10 and FIG. 6 is a table showing the results of judgement on the high-pressure damper 10. The high-pressure damper 10 shown in FIG. 1 is characterized in that rigidity thereof is improved by joining together a plurality of diaphragms 102A and 102B. That is, the two diaphragms 102A and 102B having the same thickness and size as those of the above-mentioned diaphragm 102 are placed one upon the other and the peripheral portions of the diaphragms 102A and 102B are sealed by and supported between the case 100 and the plate 101. Elements other than the diaphragms 102A and 102B are the same as those of the prior art shown in FIG. 9. In this case, the total thickness of the diaphragms 102A and 102B is 2d (d is the thickness of each of the diaphragms 102A and 102b). That is, the total thickness becomes 2 times the thickness of each of the diaphragms when two diaphragms are used and 3 times when three diaphragms are used.

In FIG. 3, Comparative Example has only one diaphragm 102C whose thickness is 2 times the thickness of the above-described diaphragm 102, whose size is the same as that of the diaphragm 102 and whose peripheral portion is sealed by and supported between the case 100 and the plate 101.

With reference to FIG. 4, the results of a rigidity comparison test which depends on pressure and a volume change among the prior art, Comparative Example and Embodiment 1 will be described below. FIG. 4 shows the difference of pressure before and after the diaphragm on the axis of abscissa and changes in the volume of the first high-pressure chamber 103 on the axis of ordinates and plots changes in the volume of the first high-pressure chamber 103 which are calculated from the amount of bending of each of the diaphragms 102, 102A and 102B, and 102C toward the second high-pressure chamber 104 when pressure is applied to each of the diaphragms 102, 102A and 102B, and 102C from the first high-pressure chamber 103. The curve L1 shows the prior art, the curve L2 shows Comparative Example and the curve L3 shows Embodiment 1. It is understood from FIG. 4 that volume changes are smaller and rigidity is higher in Comparative Example than the prior art. It is also understood that when the diaphragms 102A and 102B are placed one upon the other and the total thickness of the diaphragms 102A and 102B of Embodiment 1 is made equal to that of Comparative Example, rigidity is increased to almost the same level as that of Comparative Example. Although a reduction in performance is apprehended when rigidity is increased, it is also confirmed that an increase in rigidity has a smaller influence upon pulsation absorption capability in Embodiment 1 and Comparative Example than the prior art.

With reference to FIG. 5, the results of a stress comparison test which depends on the above volume changes and stress generated on the surface among the prior art, Comparative Example and Embodiment 1 will be described below. FIG. 5 shows changes in the volume of the first high-pressure chamber 103 on the axis of abscissa and stress generated on the surface of the diaphragm on the axis of ordinates and plots stress generated on the surface of each of the diaphragms 102, 102A and 102B, and 102C with respect to volume changes shown in FIG. 4. In FIG. 5, the curve L4 shows the prior art, the curve L6 shows Comparative Example and the curve L5 shows Embodiment 1. It is understood from FIG. 5 that stress generated on the surface of Embodiment 1 has linearity similar to that of the prior art. It is also understood that stress generated on the surface of Comparative Example has linearity similar to that of Embodiment 1 while a volume change is small but becomes larger than that of Embodiment 1 as the volume change increases and becomes nonlinear.

It is comprehended from the test results of FIG. 4 and FIG. 5 that the thickness of the diaphragm may be made 2 times that of the diaphragm 102 of the prior art as in Comparative Example which has only one thick diaphragm 102C to increase rigidity against foreign matter. When there is only one thick diaphragm 102C as in Comparative Example, stress generated on the surface suddenly rises as the volume change increases and becomes high when the diaphragm 102C functions as a general high-pressure damper 10, whereby durability may be reduced during operation. In contrast to this, it is obvious that when the diaphragms 102A and 102B having the same thickness and size as those of the diaphragm 102 of the prior art are placed one upon the other and the peripheral portions of the diaphragms 102A and 102B are sealed by and supported between the case 100 and the plate 101 as in Embodiment 1, stress generated on the surface can be reduced to the same level as that of the prior art and rigidity can be increased to the same level as that of Comparative Example. In the case of Comparative Example, it is possible to provide stress generated on the surface with linearity similar to that of Embodiment 1 and the prior art by increasing the size of the diaphragm 102C but it is inevitable that the high-pressure damper 10 becomes bigger in size. Therefore, it can be understood from the structure of Embodiment 1 that the high-pressure damper 10 has higher rigidity than that of the prior art and has excellent capability of absorbing the pulsation of high-pressure fuel while it remains the same in size.

In FIG. 6, stress generated on the surface is judged as O but rigidity as X in the prior art when the results of a rigidity comparison test shown in FIG. 4 and the results of a surface generated stress comparison test shown in FIG. 5 are taken into consideration. In Comparative Example, stress generated on the surface is judged as X but rigidity as O. In Embodiment 1, stress generated on the surface and rigidity can be both judged as O.

According to the structure of Embodiment 1, as the diaphragms 102A and 102B having the same thickness and size as those of the prior art are placed one upon the other and the peripheral portions of the diaphragms 102A and 102B are sealed by and supported between the case 100 and the plate 101, the rigidity of the diaphragms 102A and 102B can be increased while stress generated in the diaphragms 102A and 102B can be reduced to the same level as that of the prior art, thereby making it possible to prevent the deformation and breakage of the diaphragms 102A and 102B caused by foreign matter such as metal powders. When extremely high pressure is applied to the diaphragms 102A and 102B from the second high-pressure chamber 104, or when the pressure of gas in the first high-pressure chamber 103 is reduced to an extremely low level, the diaphragms 102A and 102B contact the first high-pressure chamber side stopper 106. When pressure is further applied in the same direction, the durability of the diaphragms 102A and 102B can be improved.

Embodiment 2

Figure 7:
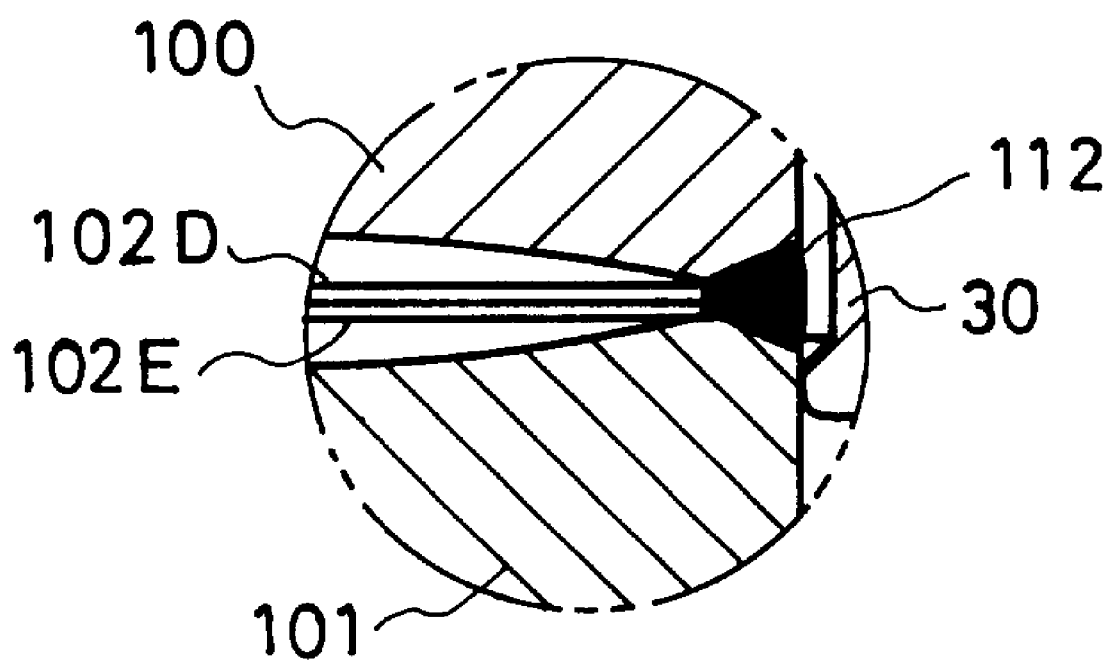
FIG. 7 is a sectional view of a high-pressure damper and a portion therearound of a high-pressure fuel pump according to Embodiment 2 of the present invention.
Figure 8:
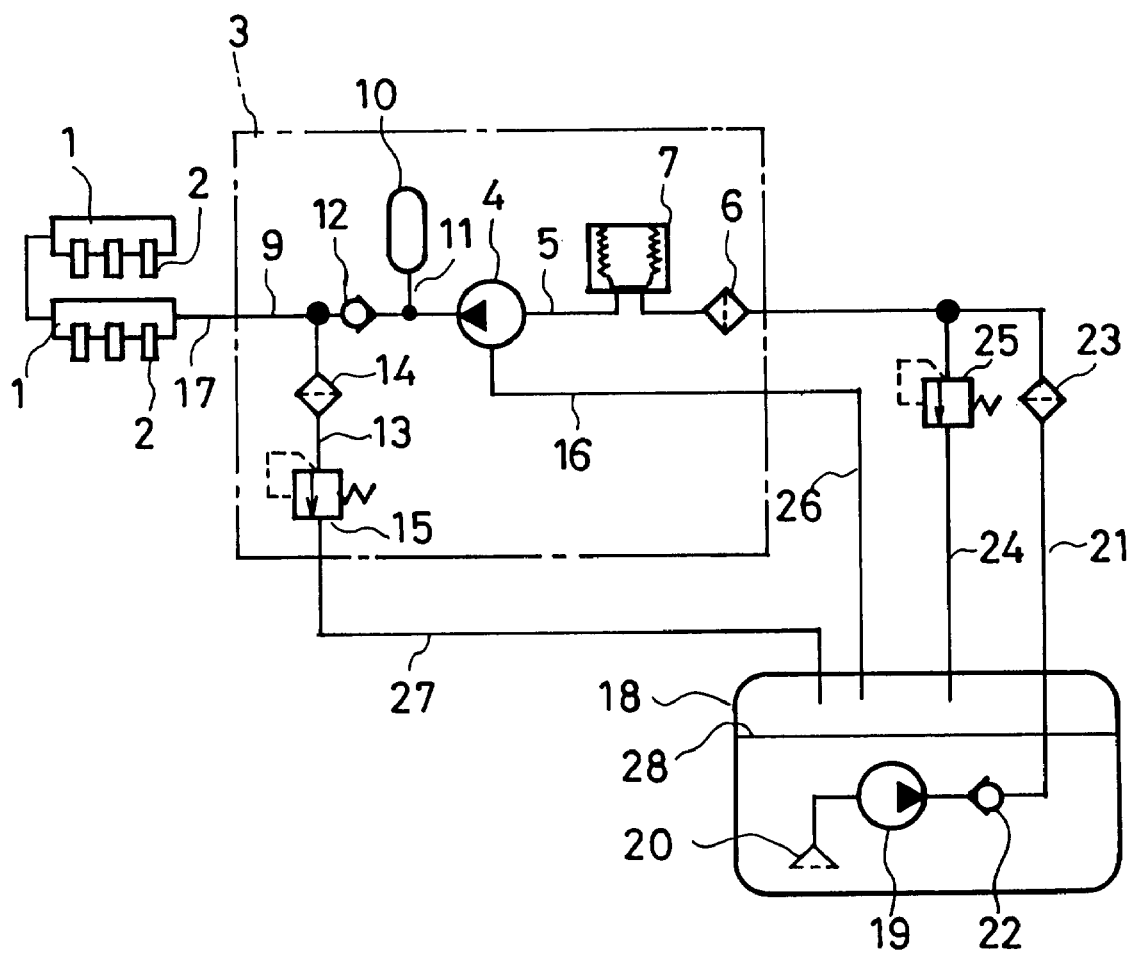
FIG. 8 is a diagram showing a car fuel supply system of the prior art.

In Embodiment 1, the diaphragms 102A and 102B are made from the same material. However, as shown in FIG. 7, diaphragms 102D and 102E can be made from different materials. FIG. 7 is a sectional view of the peripheral portions and a portion therearound of the diaphragms 102D and 102E of the high-pressure damper 10 according to Embodiment 2 of the present invention. In FIG. 7, the diaphragms 102D and 102E have the same thickness and size as those of the diaphragm 102 of the prior art. However, the diaphragm 102D is made from austenite stainless steel and the diaphragm 102E is made from deposition hardened stainless steel. Since these diaphragms 102D and 102E are placed one upon the other and the peripheral portions thereof are sealed by and supported between the case 100 and the plate 101, ferrite separates out in the welded portion 112, thereby improving the ductility of the welded portion 112 and the rupture strength of the welded portion 112. By using deposition hardened stainless steel which is advantageous to improve the strength of the material in the diaphragm on the first high-pressure chamber side and austenite stainless steel in the diaphragm on the second high-pressure chamber side, the pressure strength of the welded portion 112 can be improved while durability against foreign matter is retained.

Embodiment 3

In Embodiments 1 and 2, two diaphragms 102A and 102B, or two diaphragms 102D and 102E are used. The number of diaphragms may be 3 or more.

As described above, according to the first aspect of the present invention, a plurality of flexible metal disk-like diaphragms of the same thickness and size are placed one upon another, the total thickness of the diaphragms is a value obtained by multiplying the thickness of each diaphragm by the number of the diaphragms, and the peripheral portions of the plurality of diaphragms placed one upon another are sealed and supported by the high-pressure container. Therefore, the rigidity of the diaphragms can be increased and the deformation and breakage of the diaphragms caused by foreign matter such as metal powders can be prevented while stress generated in the diaphragms can be reduced to the same level as that of the prior art.

According to the second aspect of the present invention, since the plurality of diaphragms are made from different materials, the material of each diaphragm can be selected from the viewpoint of pulsation absorption capability and pressure strength required for the diaphragms.

According to the third aspect of the present invention, one of the plurality of diagrams made from different materials is made from deposition hardened stainless steel while the other is made from austenite stainless steel. Therefore, the peripheral portions of the diaphragms are sealed and supported by the high-pressure container by welding, whereby ferrite separates out in the welded portion, thereby making it possible to improve the ductility and rupture strength of the welded portion.

According to the fourth aspect of the present invention, since the diaphragm made from austenite stainless steel is arranged on a side which receives the pulsation of high-pressure fuel, the rupture strength of the welded portion can be improved while durability against foreign matter is retained.

What is claimed is:

1. A metal diaphragm type pulsation absorber for a high-pressure fuel pump comprising a flat flexible metal disk-like diaphragm member installed in a high-pressure container forming high-pressure chambers, and having a peripheral portion sealed and supported by the high-pressure container, wherein a plurality of discrete diaphragms each having a same thickness and size, disposed one upon another, and a total thickness of the plurality of diaphragms is a value obtained by multiplying the thickness of an individual diaphragm by the number of diaphragms.

2. The metal diaphragm type pulsation absorber for a high-pressure fuel pump according to claim 1, wherein the plurality of diaphragms are made from different materials.

3. The metal diaphragm type pulsation absorber for a high-pressure fuel pump according to claim 2, wherein one of the diaphragms is made from deposition hardened stainless steel and another one of the diaphragms is made from austenite stainless steel.

4. The metal diaphragm type pulsation absorber for a high-pressure fuel pump according to claim 3, wherein the diaphragm made from austenite stainless steel is arranged on a side which receives pulsations of high-pressure fuel.

* * * * *